United States Patent
Shafique et al.

(10) Patent No.: US 7,445,025 B2
(45) Date of Patent: Nov. 4, 2008

(54) COMBINATION VALVE

(75) Inventors: Amjed Shafique, Hoffman Estates, IL (US); Chalard Bunluaphob, Glenview, IL (US); Prasert Buranatum, Skokie, IL (US); Lisa Hathy-Riles, Wheeling, IL (US); Dan Schaffer, Schaumburg, IL (US); Mark Hegberg, Elmhurst, IL (US)

(73) Assignee: ITT Manufacturing Enterprises, Inc, Wilmington, DE (US)

( * ) Notice: Subject to any disclaimer, the term of this patent is extended or adjusted under 35 U.S.C. 154(b) by 13 days.

(21) Appl. No.: 11/374,627

(22) Filed: Mar. 13, 2006

(65) Prior Publication Data

US 2007/0209719 A1    Sep. 13, 2007

(51) Int. Cl.
*F16K 1/30*    (2006.01)
(52) U.S. Cl. ............. 137/614.2; 137/613; 137/565.01
(58) Field of Classification Search ........... 137/614.2, 137/613, 614, 565.01
See application file for complete search history.

(56) References Cited

U.S. PATENT DOCUMENTS

| | | | |
|---|---|---|---|
| 1,918,544 A | 7/1933 | House | |
| 3,016,062 A | 1/1962 | Zinninger | |
| 3,239,191 A | 3/1966 | Widera | |
| 3,241,810 A | 3/1966 | Keller, III | |
| 3,580,276 A * | 5/1971 | Korbilas et al. | 137/517 |
| 3,604,733 A | 9/1971 | Hubbell, III | |
| 3,722,855 A | 3/1973 | Massey | |
| 3,854,497 A | 12/1974 | Rosenberg | |
| 3,887,241 A | 6/1975 | Wickham et al. | |
| 3,889,537 A * | 6/1975 | Khuzaie | 73/861.64 |
| 4,059,250 A | 11/1977 | Guldener | |
| 4,070,068 A | 1/1978 | Wickham | |
| 4,154,203 A | 5/1979 | Peters et al. | |
| 4,157,849 A | 6/1979 | Wickham | |
| 4,199,198 A | 4/1980 | Wickham | |
| 4,259,269 A * | 3/1981 | Flowers | 261/151 |
| 4,314,673 A | 2/1982 | Rudelick | |
| RE31,059 E | 10/1982 | Hart | |
| 4,364,609 A | 12/1982 | Wickham | |
| 4,549,576 A | 10/1985 | Angel | |
| 4,571,008 A | 2/1986 | Wickham | |

(Continued)

FOREIGN PATENT DOCUMENTS

CN    2105601    5/1992

(Continued)

OTHER PUBLICATIONS

Bell & Gossett, Triple Duty Valve, Bulletin B-835, Mar. 2003.

(Continued)

*Primary Examiner*—Kevin L Lee
(74) *Attorney, Agent, or Firm*—RatnerPrestia

(57) ABSTRACT

A valve assembly is disclosed. The valve assembly includes a valve body having an inlet opening, an outlet opening, and a flow passage extending therebetween. A check valve is disposed within the flow passage. A shutoff valve is disposed within the flow passage. A venturi is disposed within the flow passage between the check valve and the shutoff valve. A fluid system into which the valve assembly is installed is also disclosed.

30 Claims, 4 Drawing Sheets

U.S. PATENT DOCUMENTS

| | | | |
|---|---|---|---|
| 4,581,944 A | 4/1986 | Obermann et al. | |
| 4,718,071 A | 1/1988 | Steffen | |
| 4,770,388 A | 9/1988 | Carman | |
| 4,811,753 A | 3/1989 | Bethune | |
| 4,844,554 A | 7/1989 | Rojecki | |
| 5,042,529 A | 8/1991 | Yeh | |
| 5,090,441 A | 2/1992 | Richmond | |
| 5,215,121 A | 6/1993 | Michl | |
| 5,314,215 A | 5/1994 | Weinhold | |
| 5,343,982 A | 9/1994 | Min | |
| 5,407,175 A | 4/1995 | Roberts et al. | |
| 5,421,209 A * | 6/1995 | Redus et al. | 73/861.04 |
| 5,546,976 A | 8/1996 | Farquhar | |
| 5,551,479 A | 9/1996 | Graves | |
| 5,577,531 A | 11/1996 | Hayden | |
| 5,599,484 A | 2/1997 | Tobinai | |
| 5,626,291 A * | 5/1997 | Flinn et al. | 239/310 |
| 5,655,563 A | 8/1997 | Johnson | |
| 5,765,612 A | 6/1998 | Morin | |
| 5,775,365 A | 7/1998 | Hayden | |
| 5,794,656 A | 8/1998 | Breslin | |
| 5,819,780 A | 10/1998 | Langan | |
| 5,857,717 A | 1/1999 | Caffrey | |
| 6,250,603 B1 | 6/2001 | Knowles et al. | |
| 6,331,020 B1 | 12/2001 | Brunella | |
| 6,602,056 B1 | 8/2003 | Totten | |
| 6,935,613 B1 | 8/2005 | Ward | |
| 2002/0162986 A1 | 11/2002 | Rocheleau | |
| 2002/0195153 A1 | 12/2002 | Reck | |
| 2004/0129913 A1 | 7/2004 | Leonard et al. | |
| 2004/0226617 A1 | 11/2004 | Arentsen et al. | |
| 2007/0080311 A1 | 4/2007 | Lum | |

FOREIGN PATENT DOCUMENTS

| | | |
|---|---|---|
| CN | 2623995 | 7/2004 |
| DE | 358845 | 9/1922 |
| EP | 0 261 326 A1 | 3/1988 |
| EP | 0 566 920 A1 | 10/1993 |
| FR | 1.310.066 | 10/1961 |
| FR | 1.600.725 | 7/1970 |
| FR | 2 602 297 | 2/1988 |
| FR | 2 649 464 A1 | 1/1991 |
| GB | 1022012 | 3/1966 |
| GB | 2 233 739 A | 1/1991 |
| JP | 57127211 A | 8/1982 |
| JP | 58102880 A | 6/1983 |

OTHER PUBLICATIONS

Bell & Gossett, Check-Trol Isolation Flow Control Flange, A-118A Dec. 2004.

Progressive Hydraulic, Inc., Parker Hydraulic Quick Couplings, 1999, p. 1, Steel Nipple.

* cited by examiner

COMBINATION VALVE

BACKGROUND OF THE INVENTION

In hydronic heating and cooling systems, a balanced system is required to assure proper fluid flow to heating/cooling terminals. A good system design requires the ability to isolate equipment for repair and also provides check valves to prevent unwanted flow in the wrong direction. Typical applications include zoned pumping, parallel pumping, and standby pumping. On smaller systems, where these functions are still necessary, present solutions require multiple different valves that must be separately installed, and can be cost-prohibitive. As a cost alternative, installers may choose a less expensive option of a standard off-the-shelf ball valve with extremely limited balancing ability to assemble the system. The valve is closed to an estimated position in order to control flow rate for the purpose of balancing. This technique is not accurate and does not provide optimum flow rate for the purpose of balancing, which results in higher than needed energy costs and sacrificed comfort.

For those installations where proper flow to terminal units is critical, the installer or balancing contractor requires an accurate method to balance the system. Balancing and flow measurement can be accomplished in several ways by using a calibrated ball valve, venturi, flow meter, or other similar device. A balanced system provides better heat and results in energy savings.

A properly installed heating system also includes flow control, or check, valves to prevent gravity flow. Without flow control valves, uncontrollable heating of zones in a building can occur. With flow control valves, when the circulating pump is off, the flow control valves are closed, preventing unwanted hot water from flowing backward. When the pump turns on, the pressure developed by the pump unseats each flow control valve and allows water to flow past the valve. Additionally, the flow control valves prevent gravity flow and prevent the system fluid from flowing in the wrong or unwanted direction, which can damage the pump and other equipment in the system.

There exists a need to provide valve that provides flow control to prevent unwanted backflow, and includes a flow meter and throttling/isolation valve to accurately balance flow through the valve and to shut off flow through the system.

SUMMARY OF THE INVENTION

Briefly, the present invention provides a valve assembly comprising a valve body having an inlet opening, an outlet opening, and a flow passage extending therebetween. A check valve is disposed within the flow passage. A shutoff valve is disposed within the flow passage. A venturi is disposed within the flow passage between the check valve and the shutoff valve.

Also, the present invention provides valve assembly comprising a valve body having an inlet opening, an outlet opening, and a flow passage extending therebetween. A valve is carried by the valve body. The valve is located in the flow passage to allow or prevent fluid flow through the fluid passage. A venturi is formed in the flow passage. A plurality of ports communicate with the venturi.

Also, the present invention provides a valve assembly comprising a first portion having a first flow passage extending therethrough and a second portion having a second flow passage extending therethrough. A check valve is disposed in the first flow passage. A venturi is disposed in the first flow passage. A shutoff valve is disposed in the second flow passage.

Further, the present invention provides a fluid system comprising a pump having a suction end and a discharge end and a piping system having a first end connected to the discharge end of the pump and a second end connected to the suction end of the pump. A valve assembly is inserted in the piping system between the first end and the second end. The valve assembly comprises a valve body having an inlet opening, an outlet opening, and a flow passage extending therebetween. A check valve is disposed within the flow passage. A shutoff valve is disposed within the flow passage. A venturi is disposed within the flow passage between the check valve and the shutoff valve.

BRIEF DESCRIPTION OF THE DRAWINGS

The foregoing summary, as well as the following detailed description a preferred embodiment of the invention, will be better understood when read in conjunction with the appended drawings, which are incorporated herein and constitute part of this specification. For the purposes of illustrating the invention, there are shown in the drawings an embodiment that is presently preferred. It should be understood, however, that the invention is not limited to the precise arrangements and instrumentalities shown. In the drawings, the same reference numerals are employed for designating the same elements throughout the several figures. In the drawings.

DETAILED DESCRIPTION OF THE INVENTION

Certain terminology is used herein for convenience only and is not to be taken as a limitation on the present invention. The terminology includes the words specifically mentioned, derivatives thereof and words of similar import. As used herein, the term "upstream" is defined to mean a direction toward the beginning of fluid flow and "downstream" is defined to mean a direction toward the end of fluid flow. The following describes an exemplary embodiment of the invention. However, it should be understood that the invention is not limited by the exemplary embodiment of the invention.

Heating systems in buildings must be properly adjusted to achieve balanced heating levels throughout the building. Without a balanced heating system, a room or a portion of the building that is located proximate to the heating source is likely to be warmer than a room or a portion of the building that is farther from the heating source. In order to heat the farther portion of the building to a satisfactory temperature, it may be necessary to overheat the portion of the building that is closer to the heating source, resulting in wasted heat and potential discomfort.

Figure 1:
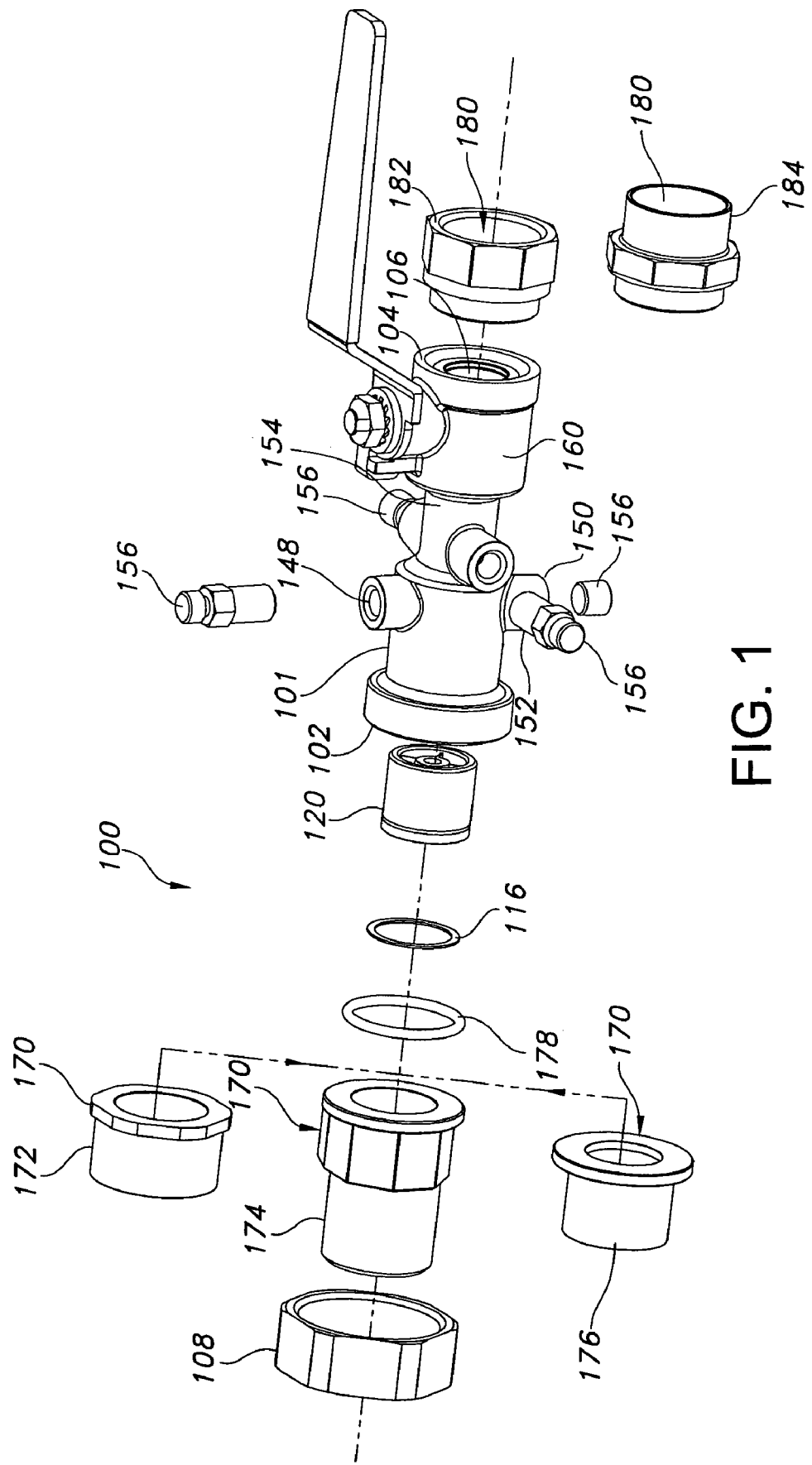
FIG. 1 is an exploded perspective view of a valve assembly according to a first embodiment of the present invention.
Figure 2:
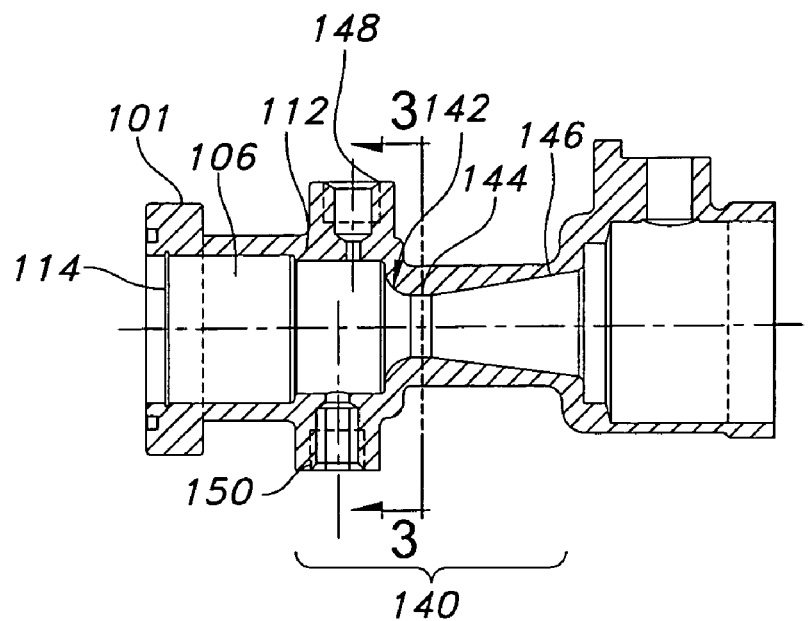
FIG. 2 is a side view, in section, of the body of the valve assembly shown in FIG. 1.

Referring to FIGS. 1 and 2 generally, a combination valve assembly 100 according to a first embodiment of the present invention is shown. The combination valve assembly 100 includes a device for measuring fluid flow rates, as well as other thermodynamic parameters. The measurement capabilities enable an operator to throttle fluid flow, providing for a more energy efficient system in which the valve assembly 100 is installed.

The valve assembly 100 includes a check valve 120, a venturi 140, and a shutoff valve 160 in the form of a ball valve, all contained therein. The valve assembly 100 may be used in heating systems to regulate the flow of hot water through the system in order to optimize the heating system and reduce the cost of operating the heating system. The check valve 120 prevents gravity flow and flow in the wrong direction; the venturi 140 is used as a flow measurement device to provide measurement data for accurate flow balancing; and the ball valve 160 throttles and isolates the fluid system in which the valve assembly 100 is inserted.

Referring specifically to FIG. 1, the valve assembly 100 includes a body 101 having an inlet opening 102, an outlet opening 104, and a fluid flow passage 106 extending between the openings.

Preferably, the check valve 120 is located at the inlet opening 102 and is operative to allow fluid flow from the inlet opening 102 toward the outlet opening 104, and to restrict flow from the outlet opening 104 toward the inlet opening 102. However, those skilled in the art will recognize that the check valve 120 may be located at the outlet opening 104 instead. In such a configuration, the check valve 120 still allows fluid flow from the inlet opening 102 toward the outlet opening 104, and restricts flow from the outlet opening 104 toward the inlet opening 102.

The check valve 120 is preferably a spring loaded valve that is closed in a no-pressure environment. One suitable check valve is disclosed in U.S. Patent Application Publication No. 2004/0226617, published on Nov. 18, 2004. However, other known check valves may be incorporated into the valve assembly 100 instead. For the preferred spring loaded check valve, when fluid pressure is applied from the upstream opening 102, the pressure overcomes the force of the spring and opens the check valve 120, allowing fluid flow through the check valve 120. When fluid pressure is applied from the downstream opening 104, the pressure aids the spring in keeping the check valve 120 closed, restricting fluid flow through the check valve 120.

Referring to FIG. 2, the check valve 120 is preferably retained within the fluid flow passage 106 by a lip 112 located between the check valve 120 (not shown in FIG. 2) and the venturi 140. The lip 112 reduces the diameter of the fluid flow passage 106 and prevents the check valve 120 from moving in a downstream direction toward the venturi 140. A groove 114 formed in the body 101 on the upstream side of the check valve 120 accepts a retaining ring 116 (shown in FIG. 1) that prevents the check valve 120 from moving in an upstream direction toward the inlet opening 102.

The venturi 140 includes an inlet 142 that necks down to a minimal diameter throat 144 and then expands to an outlet 146 that is approximately as wide as the inlet 142. Venturi designs are well known in the art and need not be described in detail. The venturi 140 also includes a pair of internally threaded ports 148, 150 that tap off the fluid flow passage 106 upstream of the inlet 142. The ports 148, 150 are spaced 180 degrees around the fluid flow passage 106 from each other.

Preferably, the port 148 extends from a top portion of the valve assembly 100 and the port 150 extends from a bottom portion of the valve assembly 100. In this way, the ports 148, 150 may be used to attach, among other things, a vent valve and a drain valve, respectively, as well as pressure gauges, temperature gauges, or other hydronic accessories.

Figure 3:
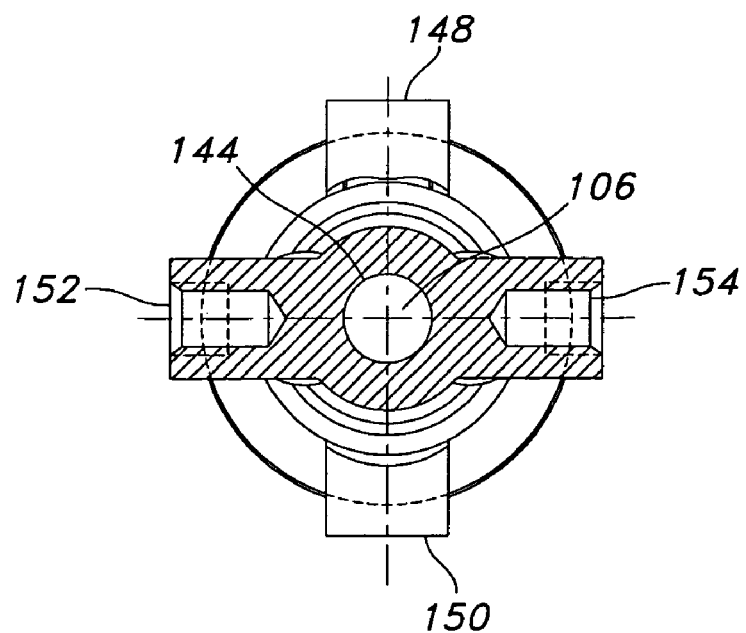
FIG. 3 is a sectional view of the valve assembly taken along lines 3-3 of FIG. 2.

Referring now to FIG. 3, an additional pair of threaded ports 152, 154 tap off the venturi 140 at the throat 144. The ports 152, 154 are spaced 180 degrees around the fluid flow passage 106 from each other, and are preferably orthogonal to the ports 148, 150. The ports 152, 154 may be used to attach, among other things, pressure gauges, temperature gauges, or other hydronic accessories.

To use the venturi 140 to provide flow measurement data, a first pressure gauge (not shown) is connected to one of the ports 148, 150 and a second pressure gauge (not shown) is connected to one of the ports 152, 154. Alternatively, a differential pressure gauge 158, shown in FIG. 2, may be connected to both of the one of the ports 148, 150 and the one of the ports 152, 154. The measurement of the pressure difference is used in conjunction with other known or measurable parameters, such as fluid viscosity and venturi size, to determine fluid flow through the valve assembly 100.

Prior to installation of the valve assembly 100 into a fluid system, each port 148, 150, 152, 154 is preferably plugged by a plug 156 (shown in FIG. 1) to prevent debris from entering the ports 148, 150, 152, 154. Typically, upon installation of the valve assembly 100 into a fluid system, at least some of the plugs 156 are removed and instrumentation and/or shutoff valves as described above are installed in place of the removed plugs 156.

Preferably, the venturi 140 is located downstream of the check valve 120 to minimize restriction at the venturi 140. However, those skilled in the art will recognize that the venturi 140 may be located upstream of the check valve 120, without departing from the spirit and scope of the present invention.

The shutoff valve 160 is preferably a standard ball valve that is operable over a range of approximately ninety degrees of rotation. The structure and operation of a ball valve is well known to those skilled in the art and need not be described in detail. The shutoff valve 160 assists in the balancing process and provides a means to isolate the system, such as for maintenance or repair. The shutoff valve 160 is also throttlable between a fully open position and a fully closed position.

Referring to FIG. 1, preferably, the inlet opening 102 includes a union connection fitting 108 for coupling the valve assembly 100 to a tailpiece 170. As shown in FIG. 1, the tailpiece 170 may comprise any of a female sweat connection 172, a male NPT connection 174, or a female NPT connection 176. For any of these tailpieces 170, an o-ring 178 is used to seal the connection between the tailpiece 170 and the body 101. Referring to FIG. 2, a groove 179 is formed in the body 101 to seat the o-ring 178.

Also preferably, the outlet opening 104 includes a fixed connection fitting 180. As seen in FIG. 1, the connection fitting 180 may be a female NPT connector 182 or a female sweat connector 184. While the connections shown are preferred connections, those skilled in the art will recognize that other connections may be used. For example, the other connections may be fixed connections on both ends; union connections (with tail pieces) on both ends; union end/fixed end; flanged connection on both ends; flanged end/union end; flanged end/fixed end; grooved connection on both ends; grooved connection/fixed end; grooved connection/flanged end; and grooved connection/union end. The flanged ends may include a rotatable flange disclosed in either or both of U.S. Patent Application Publication No. 2004/0129913, published on Jul. 8, 2004 or U.S. Patent Application Publication No. 2004/0226617, published on Nov. 18, 2004.

Figure 4:
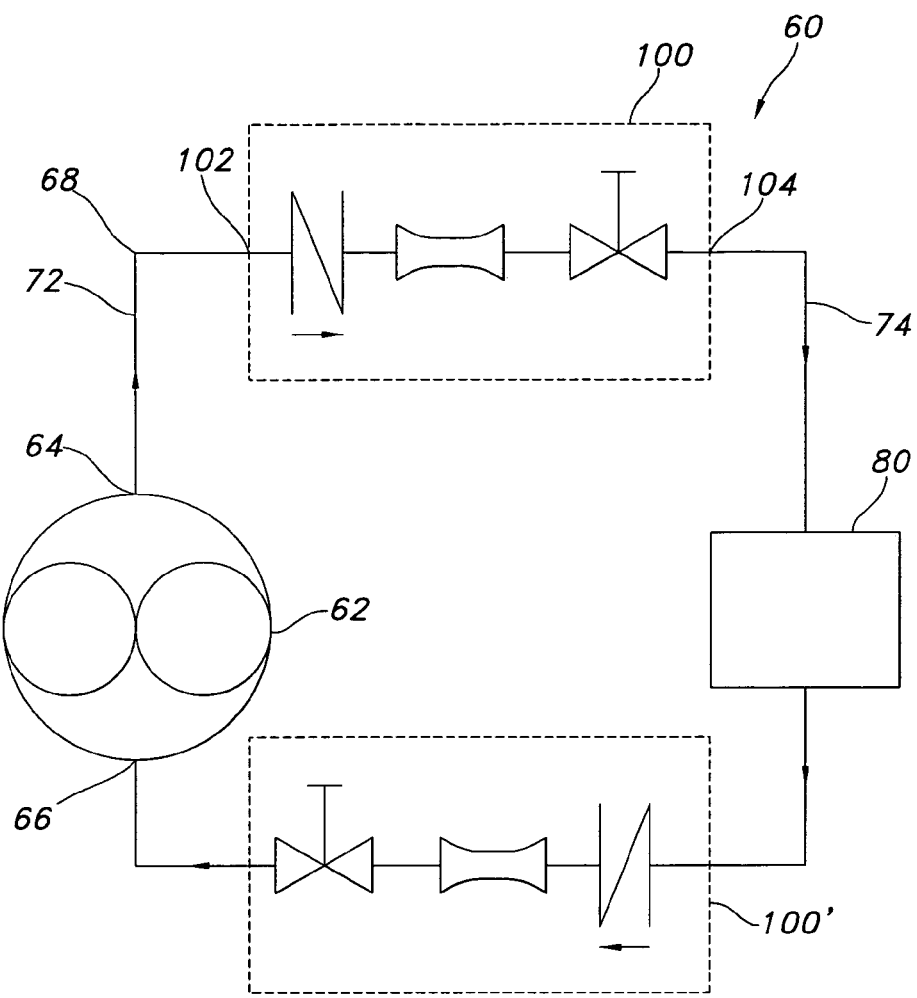
FIG. 4 is a schematic view of a fluid system incorporating the valve assembly of FIG. 1.

The valve assembly 100 is preferably used in a fluid system 60 as shown in FIG. 4. The fluid system 60 includes a pump 62 having a discharge end 64 and a suction end 66. A piping system 68 is connected to the discharge end 62 of the pump 60 such that the piping system 68 fluidly communicates with the pump 60. The valve assembly 100 is fixedly connected to the piping system 68, downstream from the pump 62. The upstream opening 102 is connected to an upstream end 72 of the piping system 68 and the downstream opening 104 is connected to a downstream end 74 of the piping system 68. An operative device 80, such as a water heater, a radiator, or some other suitable device, is also fixedly connected to the piping system 68, downstream from the pump 60. While the operative device 80 is also shown in FIG. 4 as being located downstream of the valve assembly 100, those skilled in the art will recognize that the operative device 80 may be located upstream of the valve assembly 100. Additionally, a second valve assembly 100' may be located downstream of the operative device 80. The second valve assembly 100' allows the operative device 80 to be isolated from the rest of the fluid system 60 in order to service or remove the operative device 80. Additionally, although not shown, more than one operative device 80 may be installed in the fluid system 60. The piping system 68 extends downstream of the operative device 80 back to the suction end 66 of the pump 62 to form a closed loop. Further, although not shown, the fluid system 60 may include tees and branches with other valve assemblies and operative devices installed therein.

The valve assembly 100 may be installed in the piping system 68 during initial construction of the fluid system 60, or alternatively, the valve assembly 100 may be backfit into a previously constructed piping system 68 by cutting into the piping system 68 and installing the valve assembly 100.

Differential pressure gauges (not shown) may be connected to one of the ports 148, 150 and one of the ports 152, 154 to measure flow rate through the valve assembly 100. Such flow measurements provide an operator with sufficient information to determine whether the impeller on the pump that is pumping the fluid through the heating system needs to be reduced in size. The reduction in the impeller size not only reduces fluid flow through the system, but also requires less energy to pump the fluid, resulting in lower operational costs. While the shutoff valve 160 may be throttled down to reduce fluid flow, such action does not take advantage of the financial benefits that may be achieved by reducing the impeller size instead. However, the ability to keep the shutoff valve 160 more fully open, while reducing impeller size, provides a financial benefit of the present invention through its lifespan of the system in which the valve assembly 100 is installed.

Figure 5:
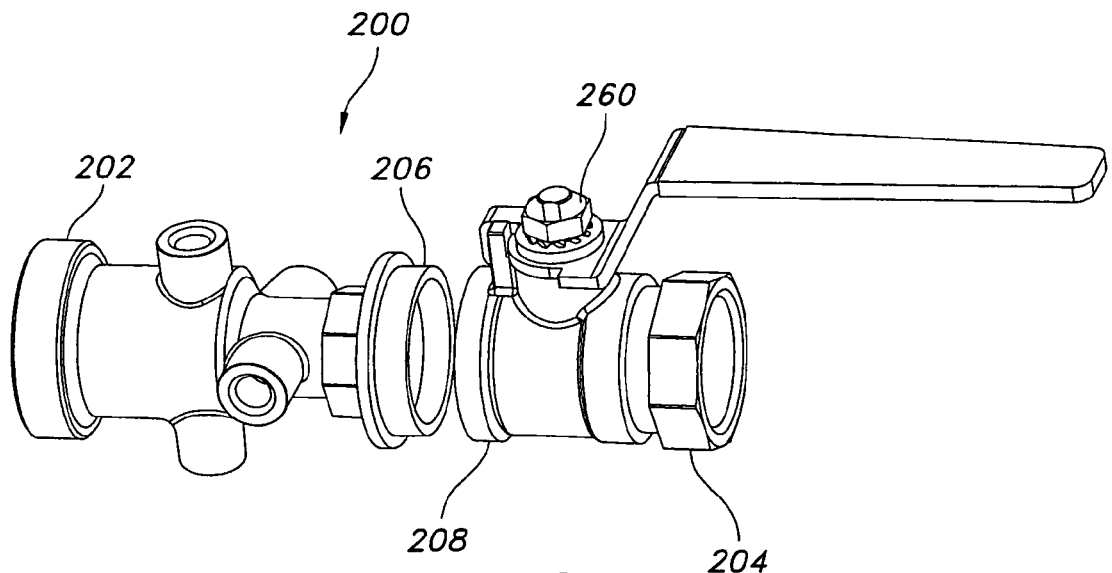
FIG. 5 is an exploded perspective view of a valve assembly according to a second embodiment of the present invention.
Figure 6:
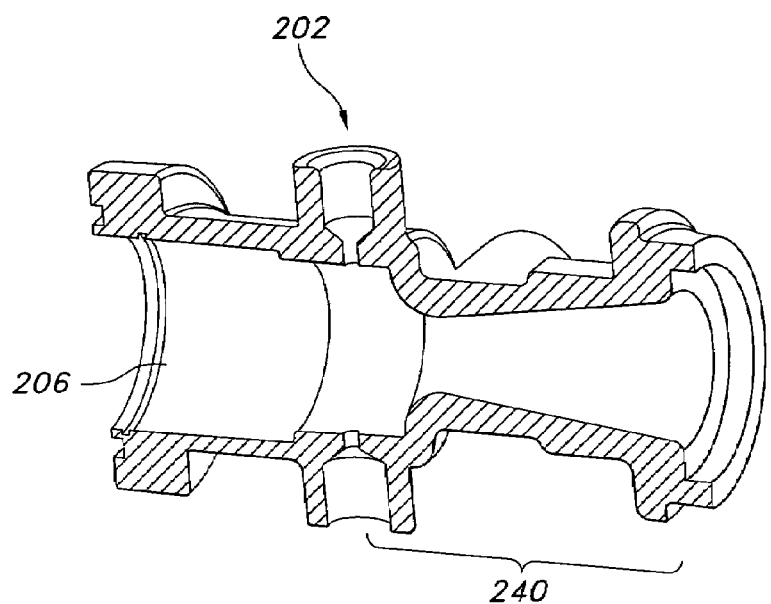
FIG. 6 is a side view, in section of an upstream portion of the valve assembly shown in FIG. 5.

A second embodiment of a valve assembly 200 according to the present invention is shown in FIGS. 5 and 6. The valve assembly 200 includes an upstream portion 202 and a downstream portion 204. Preferably, the upstream portion 202 includes a check valve (not shown), similar to the check valve 120 described above with respect to the valve assembly 100, and a venturi 240. The check valve is insertable into a fluid flow passage 206 in the upstream portion 202. Preferably, the venturi 240 is disposed downstream of the check valve, although those skilled in the art will recognize that the venturi 240 may be installed upstream of the check valve.

The downstream portion 204 includes a shutoff valve 260 similar to the shutoff valve 160 described above with respect to the valve assembly 100. The upstream portion 202 includes a male downstream end 206 that is insertable into a female upstream end 208 of the downstream portion 204 and brazed together to form a solid, liquid tight connection. The downstream end 206 and the upstream end 208 may alternatively both include threaded (i.e. NPT) connections for releasable connection of the upstream portion 202 with the downstream portion 204. Alternatively, the downstream end 206 and the upstream end 208 may both include smooth walls for a straight insertion fit, and then brazed or soldered together to form a solid connection. Still alternatively, the downstream end 206 and the upstream end 208 may be connected to each other with union fittings, flanged fittings, or grooved fittings. The flanged fittings may include a rotatable flange disclosed in either or both of U.S. Patent Application Publication No. 2004/0129913, published on Jul. 8, 2004 or U.S. Patent Application Publication No. 2004/0226617, published on Nov. 18, 2004.

While the upstream portion 202 includes the check valve and the downstream portion 204 includes the shutoff valve 260, those skilled in the art will recognize that the upstream portion 202 may include the shutoff valve 260 and the downstream portion 204 may include the check valve. The remaining elements and features of the valve assembly 100 are preferably similar to the remaining elements and features of the valve assembly 200 and need not be described in detail.

Figure 7:
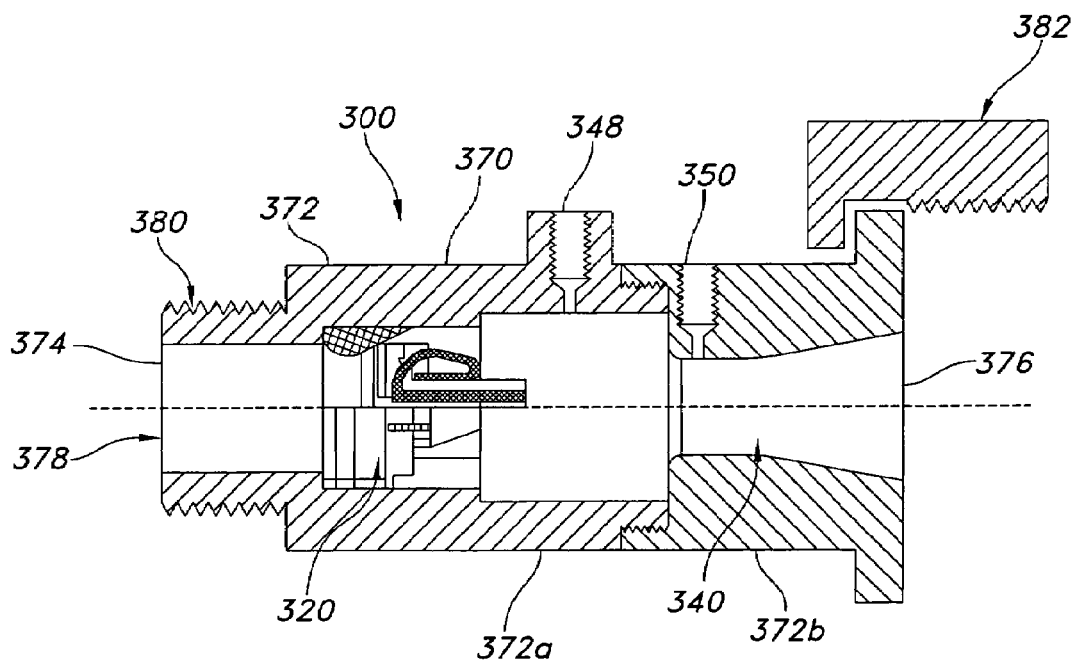
FIG. 7 is a sectional view of a tailpiece according to a third embodiment of the present invention.

A third embodiment of a valve assembly 300, shown in FIG. 7, includes a tailpiece 370 that may include a valve 320 and a venturi 340. Optionally, valve 320 or venturi 340 may be omitted from the tailpiece 370, if desired.

Tailpiece 370 may include tailpiece body 372 having an inlet opening 374 and an outlet opening 376. A flow passage 378 extends between the inlet opening 374 and the outlet opening 376. The body 372 may be formed from multiple pieces 372a, 372b that are fixedly connected together, such as by a threaded connection. The multiple pieces 372a, 372b allow for the machining of the flow passage 378 during manufacture of the tailpiece 370.

The valve 320 is carried by the body 372 within the flow passage 378. The valve 320 may be a check valve to allow fluid flow from the inlet opening 374 to the outlet opening 376, and to prevent fluid flow in from the outlet opening 376 to the inlet opening 374. The valve 320 may be a spring loaded check valve to ensure that the valve 320 is biased to a closed position in a "no-flow" condition.

The venturi 340 is formed within the flow passage 378 downstream of the valve 320. A plurality of ports 348, 350 communicate with the venturi 340. The ports 348, 350 may be used to attach, among other things, pressure gauges, temperature gauges, or other hydronic accessories.

The inlet opening 374 of the tailpiece 370 may include threaded connections, such as a male NPT connection 380 shown in FIG. 7, or a female NPT connection (not shown). The outlet opening 376 of the tailpiece 370 may include a union connection 382 as shown in FIG. 7. However, those skilled in the art will recognize that other types of connections, such as the connections described above, may be used.

The tailpiece 370 may be connected to a downstream fitting (not shown), such as a pipe, a valve, a piece of equipment, or any other HVAC device that may be connected to the tailpiece 370 with a connection, such as the union connection 382. For example, if desired, the tailpiece 370 may be connected to the valve assembly 100 in lieu of the tailpiece 170.

Preferably, the major components of the valve assemblies 100, 200, 300 are constructed from brass, although those skilled in the art will recognize that other materials, such as carbon steel, stainless steel, or other suitable materials, may be used.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A valve assembly comprising:
    a valve body having an inlet opening, an outlet opening, and a flow passage extending therebetween;
    a check valve disposed within the flow passage;
    a shutoff valve disposed within the flow passage; and
    a venturi disposed within the flow passage between the check valve and the shutoff valve,
    wherein the check valve, the shutoff valve, and the venturi are all disposed coaxially relative to each other along the flow passage.

2. The valve assembly according to claim 1, wherein the check valve is located adjacent the inlet opening.

3. The valve assembly according to claim 2, wherein the shutoff valve is disposed adjacent the outlet opening.

4. The valve assembly according to claim 1, further comprising a plurality of ports communicating with the throat of the venturi for connection to hydronic accessories.

5. The valve assembly according to claim 1, wherein the shutoff valve can be positioned between an open position and a closed position to throttle flow through the flow passage.

6. The valve assembly according to claim 1, wherein the check valve comprises a spring-loaded check valve.

7. The valve assembly according to claim 4, wherein the venturi comprises a flow measuring device.

8. The valve assembly according to claim 1, wherein the venturi is located adjacent the downstream side of the check valve.

9. The valve assembly according to claim 8, wherein the shutoff valve is located adjacent the downstream side of the venturi.

10. The valve assembly according to claim 4, wherein the hydronic accessories comprise pressure gauges.

11. A valve assembly comprising:
    a valve body having an inlet opening, an outlet opening, and a flow passage extending therebetween;
    a valve carried by the valve body, wherein the valve is located in the flow passage to allow or prevent fluid flow through the fluid passage;
    a venturi formed in the flow passage, the venturi having a throat with a plurality of ports located therein for connection to hydronic accessories; and
    a plurality of ports communicating with the venturi.

12. The valve assembly according to claim 11, wherein the venturi forms part of a flow measuring device.

13. The valve assembly according to claim 11, wherein the valve comprises a check valve located in the flow passage and operative to prevent fluid flow from the outlet port to the inlet port.

14. The valve assembly according to claim 13, wherein the check valve is adjacent the inlet opening.

15. The valve assembly according to claim 13, wherein the check valve comprises a spring loaded check valve.

16. The valve assembly according to claim 11 wherein the venturi is located downstream of the valve.

17. The valve assembly according to claim 11, wherein the hydronic accessories comprise pressure gauges.

18. A valve assembly comprising:
    a first valve body portion having a first flow passage extending therethrough;
    a second valve body portion having a second flow passage extending therethrough;
    a check valve disposed in the first flow passage;
    a venturi disposed in the first flow passage; and
    a shutoff valve disposed in the second flow passage,
    wherein the check valve, the shutoff valve, and the venturi are all disposed coaxially relative to each other.

19. The valve assembly according to claim 18, wherein the first portion is releasably coupled to the second portion.

20. The valve assembly according to claim 19, wherein the first portion is fixedly connectable to the second portion.

21. The valve assembly according to claim 18, wherein the throat of the venturi comprises a plurality of ports communicating with the venturi for connection to hydronic accessories.

22. The valve assembly according to claim 18, wherein the shutoff valve can be positioned between an open position and a closed position to throttle flow through the second flow passage.

23. The valve assembly according to claim 18, wherein the check valve comprises a spring-loaded check valve.

24. The valve assembly according to claim 18, wherein the venturi comprises a flow measuring device.

25. The valve assembly according to claim 21, wherein the hydronic accessories comprise pressure gauges.

26. A fluid system comprising:
    a pump having a suction end and a discharge end;
    a piping system having a first end connected to the discharge end of the pump and a second end connected to the suction end of the pump; and
    a valve assembly inserted in the piping system between the first end and the second end, wherein the valve assembly comprises:
        a valve body having an inlet opening, an outlet opening, and a flow passage extending therebetween;
        a check valve disposed within the flow passage;
        a shutoff valve disposed within the flow passage; and
        a venturi disposed within the flow passage between the check valve and the shutoff valve, the throat of the venturi including a plurality of ports for connection to hydronic accessories,
    wherein the check valve, the shutoff valve, and the venturi are all disposed coaxially relative to each other along the flow passage.

27. The fluid system according to claim 26, wherein the check valve restricts fluid flow from the outlet opening to the inlet opening.

28. The fluid system according to claim 26, further comprising an operative device inserted in the piping system.

29. The fluid system according to claim 28, further comprising a second valve assembly, wherein the operative device is disposed between the valve assembly and the second valve assembly.

30. The fluid system according to claim 26, wherein the hydronic accessories comprise pressure gauges.

* * * * *